UNITED STATES PATENT OFFICE.

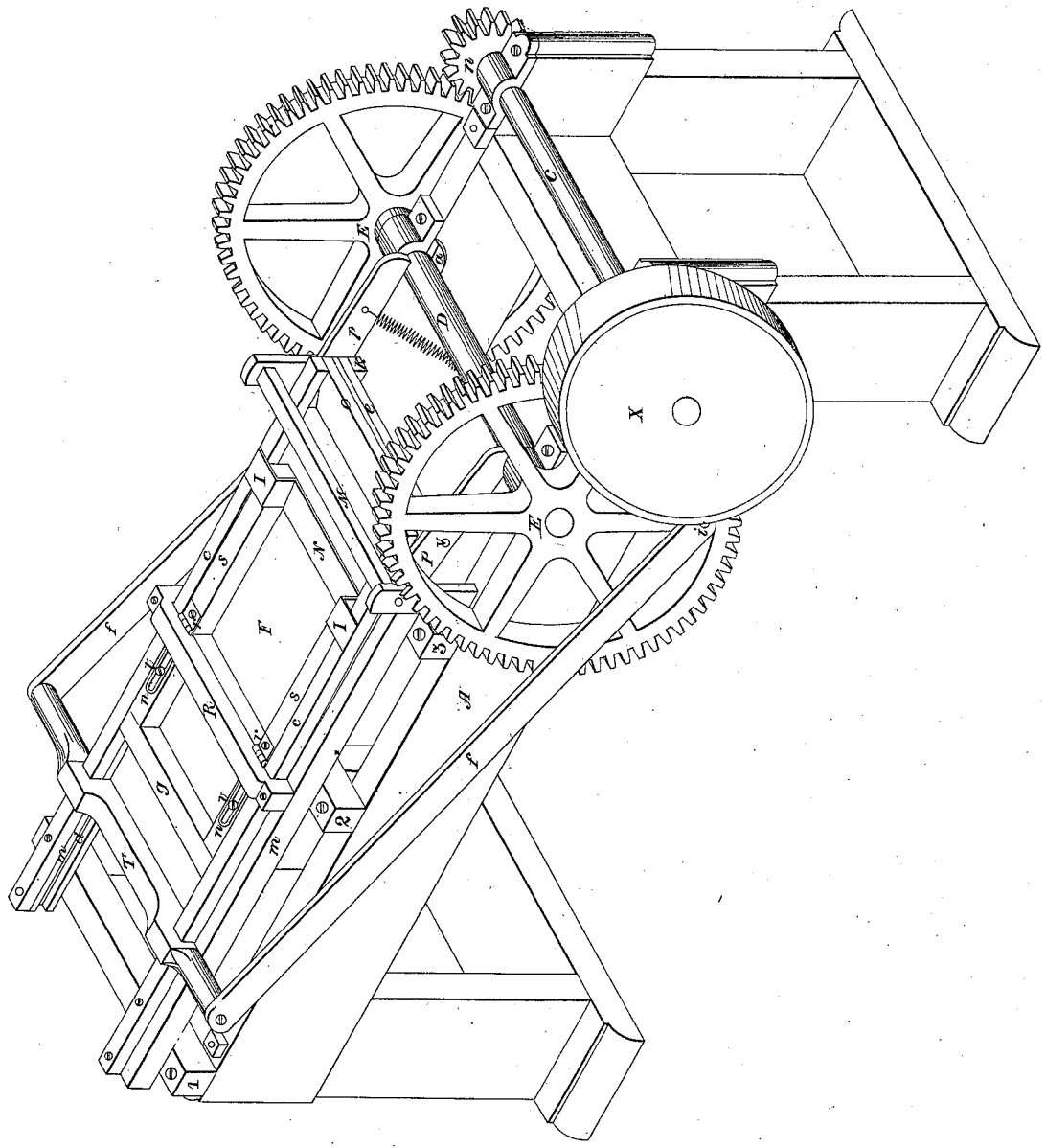
Stevens & Kidder.
Cutting Shingles.
N° 10,350.
Patented Dec. 20, 1853.

B. F. STEVENS AND WALTER KIDDER, OF LOWELL, MASSACHUSETTS.

SHINGLE-MACHINE.

Specification of Letters Patent No. 10,350, dated December 20, 1853.

*To all whom it may concern:*

Be it known that we, BENJN. F. STEVENS and WALTER KIDDER, both of Lowell, in the county of Middlesex and Commonwealth of Massachusetts, have invented a new and Improved Shingle-Machine for Splitting and Shaving Shingles; and we do hereby declare that the following is a full and exact description thereof, reference being had to the accompanying drawings, making a part of this specification, with letters referring thereto.

We construct a frame of wood A of two sides and two ends and place across the top of the frame at one end three firm crosspieces of wood Nos. 1, 2 and 3, and secure the ends of them to the sides of the frame by means of bolts or screws. On the upper side of each of these crosspieces and near the ends of the same we cut two grooves or recesses into which are placed two bars sufficiently large to fill them called the lower side bars the end of one of which is seen in the accompanying drawings marked $k$. These are secured in this manner parallel to each other and the sides of the frame and their upper surfaces even with the top of the crosspieces 1, 2 and 3. To the forward ends of these we secure the lower shaving knife $e$ which extends from one to the other directly across at a right angle with the side bars $k$. We then place a driving shaft C at the forward end across the frame in suitable bearings and secure a pulley X to one end of it for the application of power. We then place two small gears $h$ upon this shaft one each side of the machine the teeth of which play into the teeth of two larger gears E, E, placed upon the crank shaft D which rests also upon the top of the frame in suitable bearings. We place two guide rails $m$ $m$ one upon each side of the machine directly over the side bars $k$ and parallel with them which are made secure to the crosspieces by means of bolts and on the inside of each of these rails we make a groove $d$ from end to end to receive the driver and permit it to glide freely forward and backward. We then place a bed plate on the top of the two crosspieces Nos. 2 and 3 seen on the under side of the model directly beneath the driver F sufficiently wide to cover the entire space between the two guide rails $m$ $m$ and long enough to extend from the front side of the crosspiece No. 3, to the back side of the middle one No. 2, and make its thickness equal to the distance from the top of the crosspieces to the lower side of the grooves in the guide rails in order that its upper surface may be level with the lower side of these grooves. We then place two more side bars $c$ $c$ directly over the guide rails $m$ $m$ and the lower side bars $k$ and secure them at the backward end in such a manner as to leave the forward end free to rise and fall the distance of the thickness of a shingle and thereby elevate or depress the upper shaving knife $o$ which is secured to the ends of the bars directly over the lower shaving knife $e$. We then place two side levers $p$ $p$ on the outside of the bars $k$ and $c$ $c$ at their forward ends and secure the backward ends of these levers by round bolts to the upper side bars $c$ $c$ a short distance from their ends and then placing the levers diagonally downward and forward so as to cross the lower side bars $k$ farther forward than the bolts by which they are secured to the upper side bars and secure them in that position to the lower side bars $k$ by two more round bolts $v$ which pass through two slightly elongated openings in the side levers and screw firmly into the lower side bars $k$ quite near their ends. We place these here in order that the upper and lower shaving knives may be made to approach to or recede from each other by raising or depressing the forward ends of these levers which are made to rest upon two cams $a$ placed upon the crank shaft D for that purpose by which means the shaving knives are made to open at once and then close again by a regular gradation at each revolution of the crank shaft and thereby give an exact taper to the shingle. We place a spring on the under side of these levers to draw them immediately downward after passing the point of the cams and thus open at once the shaving knives to their greatest distance while they hold them steadily on the cams as they gradually raise the levers to close the knives again. We then place in the grooves of the guide rails a driver F, made four square from a plate of iron of sufficient width to extend across the bed plate and slide securely in the grooves and thick enough to fill these spaces and of sufficient length to extend from the edges of the shaving knives backward to the cross arm T to which it is securely confined in order that the connecting rods $f$ $f$ which are attached to the rounded ends of the cross arm at one extremity and the crank pins $i$ at the other shall force the driver backward and forward at each revolution of the crank shaft. We construct two riving knife arms $s\ s$ with a hinge $r\ r$ in the middle of each of them and make a slit $n\ n$ near their back ends which we secure together by means of a short bar $g$ which passing from one to the other holds them at the right distance from each other to allow of their sliding freely between the upper side bars $c\ c$ upon the top of the driver F to which they are loosely attached by two bolts $t\ t$ passing through the slits $n\ n$. To the forward ends of these arms we attach the riving-knife N in order that it may slide back out of the way as the driver passes forward beneath the guide M to push the shingle between the shaving knives and then slip in front of the driver again as it returns with it to split the shingle from off the bolt and be in a position to rest upon and hold the back end of the shingle when the driver thrusts it forward between the shaving knives. The ends of the riving knife $l\ l$ are made to project beyond the arms and rest upon the top of the side bars $c\ c$ in order to support the knife and cause it to rise simultaneously with the opening of the shaving knives $e\ o$ and thereby catch the end of the bolt sufficiently high to split a shingle from its under surface. The hinges $r\ r$ allow the riving knife to rise with the grain of the wood when it inclines upward and also when the shaving knives open.

R is a tail stock placed across the machine and secured at either end to the side bars to receive the end of the bolt and prevent its sliding backward while the riving knife is splitting the shingle. M is a swinging guide to catch the forward end of the shingle and direct it into or between the shaving knive.

The operation of the machine is as follows. We place the machine in its first position with the driver F at its greatest distance forward and the levers $p\ p$ just past the cams $a$ when the shaving knives $o\ e$ will be fully open the riving knife N raised the thickness of a shingle above the top of the driver and slipped back upon it as far as the slits $n\ n$ will allow of. A bolt of wood of proper length to make a shingle is then placed in front of the tail stock R upon the top of the driver with its back end resting against the tail stock and its forward end just back of the riving knife. If power is now applied to the pulley X the crank shaft D will be made to rotate and by means of the connecting rods $f\ f$ cause the driver F to move backward the distance of the length of the slits in the riving knife arms when the bolts $t\ t$ will catch the arms and draw them back with the riving knife which was resting against the front end of the shingle bolt of sufficient height to split a shingle from its under surface; the riving knife is then drawn backward through the bolt until its back edge comes to the back end of the bolt and thus splits the shingle completely off which now rests wholly upon the bed plate with its back end under the riving knife and the driver against the end, the driver having drawn back from under the knife as far as its back edge and allowed the shingle to drop in front of it. The crank shaft has now made one-half a revolution while the shaving knives up to this point have remained unmoved by the levers $p\ p$ which have rested upon the shaft D untouched by the cams $a$ the cams having just reached the ends of the levers. We now complete the revolution and the driver starts forward pushing the shingle which is held down at its back end by the riving knife under the guide M (which acts as an inverted inclined plane) between the shaving knives $e\ o$ which now begin as the cams raise the levers to close with a regular gradation and taper the shingle as it is forced onward by the driver still held down by the riving knife until the knife has passed the forward end of the bolt and reached the guide M. where it is caught at its ends $l\ l$ by a small pin placed in the top of the upper side bars $c\ c$ and there retained while the driver still goes on under the guide to press the shingle completely through the edges of the shaving knives, which being accomplished completes the revolution and the point of the cams again just past the ends of the levers which have dropped again upon the crank shaft D immediately opening the shaving knives and raising the riving knife in readiness for another revolution.

Having thus fully described our machine, and the operation thereof, what we claim as our invention as new and useful, is—

1. We claim the combination of the movable side bars with the shaving knives and cams arranged and operated as shown and described for the purposes hereinbefore substantially set forth.

2. The combination of the sliding arms (carrying the riving knife) with the driver for the purposes and in the manner hereinbefore substantially set forth.

BENJN. F. STEVENS,
WALTER KIDDER.

Witnesses:
E. W. Scott,
Thos. C. Kendrick.